(12) United States Patent
Lin et al.

(10) Patent No.: US 11,472,435 B2
(45) Date of Patent: Oct. 18, 2022

(54) TRAJECTORY DETERMINATION METHOD FOR A VEHICLE

(71) Applicant: Automotive Research & Testing Center, Lugong (TW)

(72) Inventors: Yu-Ting Lin, Lugong (TW); Tsung-Ming Hsu, Lugong (TW)

(73) Assignee: AUTOMOTIVE RESEARCH & TESTING CENTER, Lugong (TW)

(*) Notice: Subject to any disclaimer, the term of this patent is extended or adjusted under 35 U.S.C. 154(b) by 193 days.

(21) Appl. No.: 17/107,047

(22) Filed: Nov. 30, 2020

(65) Prior Publication Data
US 2022/0169281 A1 Jun. 2, 2022

(51) Int. Cl.
| | |
|---|---|
| *B60W 40/04* | (2006.01) |
| *B60W 30/09* | (2012.01) |
| *G06V 20/58* | (2022.01) |
| *B60W 60/00* | (2020.01) |
| *B60W 30/095* | (2012.01) |
| *G06V 20/56* | (2022.01) |

(52) U.S. Cl.
CPC ........ *B60W 60/0011* (2020.02); *B60W 30/09* (2013.01); *B60W 30/0956* (2013.01); *B60W 40/04* (2013.01); *B60W 60/0015* (2020.02); *B60W 60/00274* (2020.02); *G06V 20/58* (2022.01); *G06V 20/588* (2022.01); *B60W 2554/801* (2020.02); *B60W 2555/60* (2020.02)

(58) Field of Classification Search
CPC ........ B60W 60/0011; B60W 60/0015; B60W 60/00274; B60W 30/09; B60W 30/0956; B60W 40/04; B60W 2555/60; B60W 2554/801; G06V 20/58; G06V 20/588

USPC .......................................................... 701/301
See application file for complete search history.

(56) References Cited

U.S. PATENT DOCUMENTS

| | | | | |
|---|---|---|---|---|
| 2017/0003683 | A1* | 1/2017 | Sato ...................... | B60W 30/12 |
| 2018/0370526 | A1* | 12/2018 | Ohmura ................ | G06V 20/58 |
| 2020/0269873 | A1* | 8/2020 | Liu ....................... | G05D 1/0238 |

(Continued)

FOREIGN PATENT DOCUMENTS

| | | | |
|---|---|---|---|
| CN | 105509760 B | 1/2018 | |
| CN | 106846901 B | 7/2019 | |
| DE | 102014223000 A1 * | 5/2016 | ............ B60W 30/06 |

(Continued)

OTHER PUBLICATIONS

Wei-Jen Wang, "Optimal Trajectory Planning with Dynamic Constraints for Autonomous Vehicle", Sep. 10-13, 2019, 58th Annual Conference of the Society of Instrument and Control Engineers of Japan (SICE), (Year: 2019).*

(Continued)

*Primary Examiner* — Elaine Gort
*Assistant Examiner* — Matthias S Weisfeld
(74) *Attorney, Agent, or Firm* — Birch, Stewart, Kolasch & Birch, LLP

(57) ABSTRACT

A trajectory determination method for a vehicle is provided. A target vehicle trajectory is determined from among multiple candidate vehicle trajectories by considering, for each of the candidate vehicle trajectories, presence or absence of a front obstacle, presence or absence of a potentially-colliding obstacle, and a condition related to lane change, so as to enhance driving safety of the vehicle.

7 Claims, 9 Drawing Sheets

(56) References Cited

U.S. PATENT DOCUMENTS

2020/0339079 A1* 10/2020 Ohmura .......... B60W 30/18159
2021/0284091 A1*  9/2021 Balasubramanian ... B60R 22/04

FOREIGN PATENT DOCUMENTS

TW          I612502 B      1/2018
TW          I675771 B     11/2019

OTHER PUBLICATIONS

Sebastien Glaser, "Maneuver-Based Trajectory Planning for Highly Autonomous Vehicles on Real Road With Traffic and Driver Interaction", Sep. 2010, IEEE Transactions on Intelligent Transportation Systems, vol. 11, No. 3 (Year: 2010).*

* cited by examiner

Calculate a cost value for each trajectory data piece based on an upper speed limit, the front-obstacle flags, the intersection flags, the lane-change flags, the safety flags, proposed vehicle velocities, the TTC values, the time gap values, the PTTC values and the buffer distances acquired for the trajectory data piece —261

Select a target trajectory data piece from among the trajectory data pieces based on the cost values acquired for the trajectory data pieces —262

FIG.8

TRAJECTORY DETERMINATION METHOD FOR A VEHICLE

FIELD

The disclosure relates to a trajectory determination method adapted for a self-driving vehicle, and more particularly to a method for estimating a best driving path based on current driving environment.

BACKGROUND

In recent years, research and development related to self-driving has been flourishing, and most of the relatively more mature and commercially viable self-driving systems on the market today operate according to fixed routes in enclosed areas. However, the driving situations or settings are more complicated on the general road environment, which may have mixed flows of pedestrians and vehicles, including various motor vehicles (e.g., cars, trucks, buses and motorcycles) and bikes, etc.

In order to make the use of self-driving vehicles practically and deeply applicable to the general road environment, many manufacturers have started to develop technologies related to the dynamic trajectory of self-driving vehicles. The ability to determine the path enables the self-driving vehicle to make decisions that more closely resembles normal driving behavior of human drivers when it encounters environmental obstacles; for example, the self-driving vehicle may overtake the vehicle in front or dodge obstacles in the same lane. This ability affects the safety of the self-driving vehicle and its ability to deal with complex situations.

However, the conventional self-driving vehicles do not have a defined logic in the way that it decides on its driving behavior based on the current driving environment, which leads to high uncertainty. As an example, when there is a slow vehicle in the front, actions that can be taken by such a conventional self-driving vehicle may include following the slow car, braking hard, overtaking the slow car, etc. However, without a defined logic, developers or inspectors cannot confirm whether the self-driving vehicle behaves normally, and cannot make judgement on the actions taken by the self-driving vehicle when an accident occurs. In addition, the conventional self-driving vehicles make decisions based on only the current environment, and are unable to deal with changes in the environment that may interfere with the planned path, such as incoming pedestrians, moving cars, etc., so this also raises safety concerns.

SUMMARY

Therefore, an object of the disclosure is to provide a trajectory determination method for a vehicle. The trajectory determination method plans a trajectory for the vehicle by taking into consideration intended trajectory of an obstacle, thereby enhancing the safety of the planned trajectory.

According to the disclosure, the trajectory determination method is implemented by a processing module that is electrically connected to a trajectory generation module, an obstacle detection module, a lane space detection module, and a road information module. The trajectory generation module generates a plurality of trajectory data pieces. Each of the trajectory data pieces includes multiple trajectory points that cooperatively compose a candidate vehicle trajectory for the vehicle to follow during a vehicle travelling time period, and multiple proposed vehicle velocities of the vehicle respectively at the trajectory points. The obstacle detection module detects obstacles that are spaced apart and within a predetermined distance from the vehicle to generate obstacle data pieces that are respectively related to the obstacles. Each of the obstacle data pieces includes an obstacle location, an obstacle velocity and an obstacle acceleration of the corresponding one of the obstacles. The lane space detection module detects a pair of lateral distances respectively for two sides of the vehicle, wherein each of the lateral distances is a distance between the vehicle and one of the obstacles that is at the respective side of the vehicle and that is spaced apart from the vehicle laterally. The road information module provides a speed limit of a road on which the vehicle is travelling. The trajectory determination method includes: A) for each of the trajectory data pieces, acquiring a block flag, multiple TTC (time to collision) values and multiple time gap values based on the obstacle data pieces and the proposed vehicle velocities at the trajectory points of the trajectory data piece, wherein the block flag indicates whether the obstacles include a front obstacle in the candidate vehicle trajectory of the trajectory data piece, wherein each of the TTC values corresponds to a respective one of the trajectory points and indicates a length of time after which the vehicle at the trajectory point will collide with the front obstacle and wherein each of the time gap values corresponds to a respective one of the trajectory points and indicates a time difference between passages of the vehicle at the trajectory point and the front obstacle through the obstacle location of the front obstacle; B) for each of the trajectory data pieces, acquiring an intersection flag and multiple PTTC (prediction time to collision) values based on the obstacle data pieces and the proposed vehicle velocities at the trajectory points of the trajectory data piece, wherein the intersection flag indicates whether the obstacles include a potentially-colliding obstacle with a predicted obstacle path that intersects the candidate vehicle trajectory of the trajectory data piece, and wherein each of the PTTC values corresponds to a respective one of the trajectory points and indicates a possible length of time after which the potentially-colliding obstacle will collide with the vehicle; C) for each of the trajectory data pieces, acquiring a buffer distance for each of the trajectory points of the trajectory data piece based on the lateral distances detected by lane space detection module; D) for each of the trajectory data pieces, acquiring a lane-change flag that indicates whether the candidate vehicle trajectory of the trajectory data piece will cause a lane change for the vehicle; E) for each of the trajectory data pieces, acquiring a safety flag based on the obstacle data pieces and the vehicle travelling time period, wherein the safety flag indicates whether the lane change is safe; and F) based on the speed limit, the block flag, the intersection flag, the lane-change flag, the safety flag, the TTC values, the time gap values, the PTTC values and the buffer distance that are acquired for each of the trajectory data pieces, determining a target trajectory data piece from among the trajectory data pieces for the vehicle to drive along the candidate vehicle trajectory of the target trajectory data piece.

BRIEF DESCRIPTION OF THE DRAWINGS

Other features and advantages of the disclosure will become apparent in the following detailed description of the embodiment(s) with reference to the accompanying drawings, of which:

FIG. 8 is a flow chart illustrating step 26 of the embodiment in detail.

DETAILED DESCRIPTION

Figure 1:
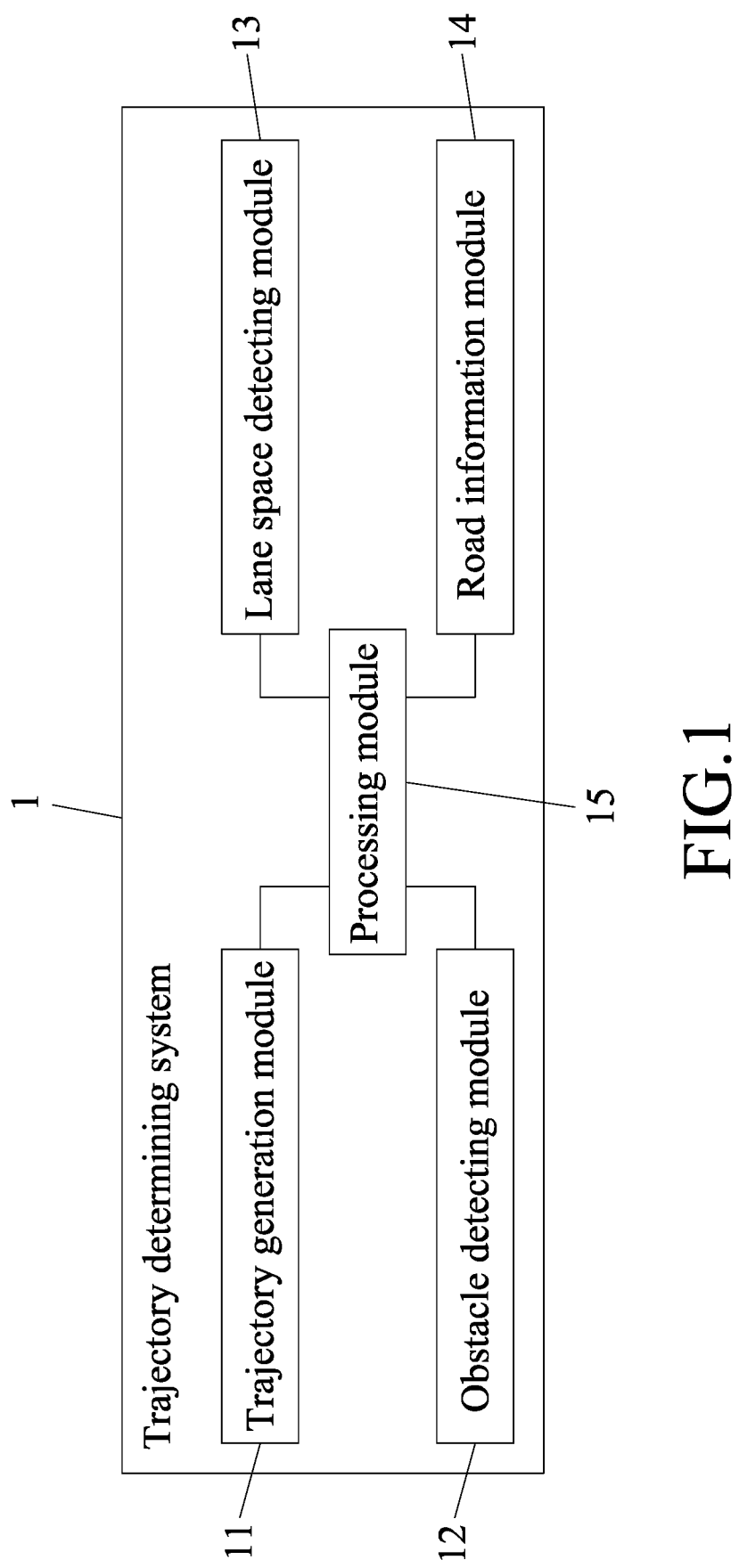
FIG. 1 is a block diagram exemplarily illustrating a trajectory determination system to implement an embodiment of a trajectory determination method for a vehicle according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a trajectory determination system 1 is shown to implement an embodiment of a trajectory determination method for a vehicle (e.g., a self-driving vehicle) according to this disclosure. The trajectory determination system 1 includes a trajectory generation module 11, an obstacle detection module 12, a lane space detection module 13, a road information module 14, and a processing module 15 that is electrically connected to the trajectory generation module 11, the obstacle detection module 12, the lane space detection module 13 and the road information module 14.

The trajectory generation module 11 generates a plurality of trajectory data pieces for the vehicle. Each of the trajectory data pieces includes multiple trajectory points that cooperatively compose a candidate vehicle trajectory for the vehicle to follow during a vehicle travelling time period, and multiple proposed vehicle velocities of the vehicle respectively at the trajectory points. The trajectory generation module 11 may include a vehicle detection device to detect a vehicle condition, and a road detection device to detect a road condition. In practice, the vehicle detection device may include, for example, at least one of a global positioning system (GPS), a gyroscope, an odometer, a speed meter or an inertial measurement unit (IMU); and the road detection device may include, for example, at least one of an lidar, an ultrasonic radar, a millimeter wave (mmWave) radar or a camera array that is disposed on the vehicle. The vehicle detection device is used to acquire a current position of the vehicle, and to detect a current heading angle, a current velocity and a current acceleration of the vehicle. The road detection device is used to detect a road on which the vehicle is currently travelling, so as to obtain a width and a curvature of the road, and to recognize a lane or lanes of the road. Implementation of the trajectory generation module 1 may be referenced to Taiwanese Patent No. 1674984 (its U.S. counterpart being U.S. Patent Application Publication No. 2020/0156631), so details thereof are omitted herein for the sake of brevity.

The obstacle detection module 12 detects obstacles that are spaced apart and within a predetermined distance from the vehicle to generate obstacle data pieces that are respectively related to the obstacles. Each of the obstacle data pieces includes an obstacle location, an obstacle velocity and an obstacle acceleration of the corresponding one of the obstacles. The obstacle detection module 12 may include, for example, at least one of the lidar, the ultrasonic radar, the millimeter wave (mmWave) radar or the camera array that is disposed on the vehicle.

The lane space detection module 13 detects a pair of lateral distances respectively for two sides of the vehicle, wherein each of the lateral distances is a distance between the vehicle and one of the obstacles that is at the respective side of the vehicle and that is spaced apart from the vehicle laterally. The lane space detection module 13 includes, for example, at least one of the lidar, the ultrasonic radar, the millimeter wave (mmWave) radar or the camera array, which can detect entire space around the vehicle, so as to calculate the lateral distances for the trajectory points of the trajectory data pieces. Implementation of the obstacle detection module 12 and the lane space detection module 13 may be referenced to Taiwanese Patent Nos. I453697 (U.S. counterpart Application Publication No. 2014/0071240) and I535601 (its U.S. counterpart being U.S. Patent Application Publication No. 2015/016606), so details thereof are omitted herein for the sake of brevity.

The road information module 14 is used to provide a speed limit (e.g., a maximum speed limit) of the road on which the vehicle is currently travelling. The road information module 14 may be realized, for example, as a non-volatile memory that stores the speed limit of the road.

The processing module 15 may be, for example, an automotive computer which is disposed on the vehicle and which includes a processor and a storage device.

Figure 2:
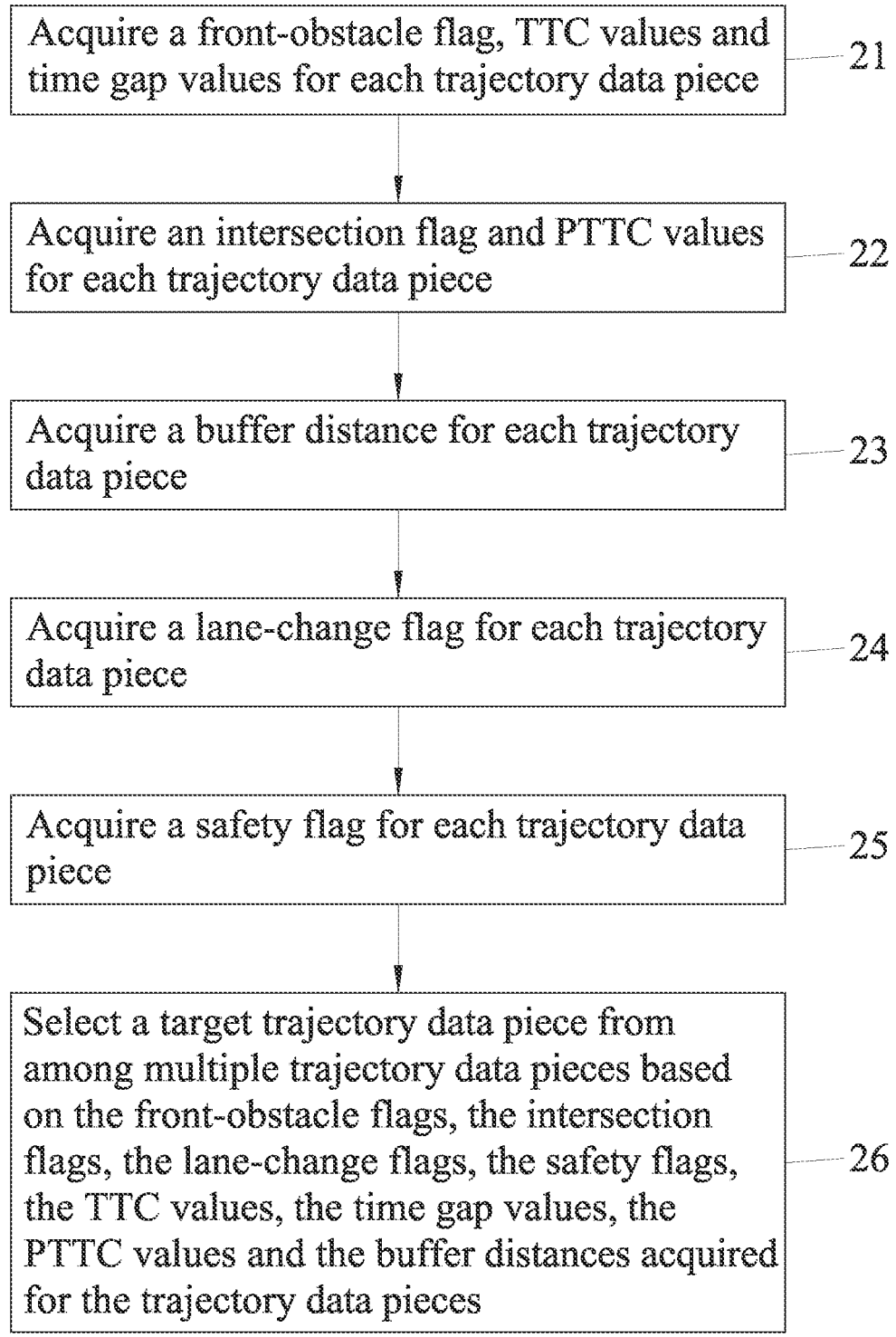
FIG. 2 is a flow chart illustrating the embodiment.

Referring to FIGS. 1 and 2, the embodiment includes steps 21-26.

In step 21, for each of the trajectory data pieces generated by the trajectory generation module 11, the processing module 15 acquires a block flag, multiple TTC (time to collision) values and multiple time gap values based on the obstacle data pieces and the proposed vehicle velocities at the trajectory points of the trajectory data piece. The block flag indicates whether the obstacles include a front obstacle in a path of the vehicle if the vehicle is to follow the candidate vehicle trajectory of the trajectory data piece (for short, whether the obstacles include a front obstacle in the candidate vehicle trajectory). Each of the TTC values corresponds to a respective one of the trajectory points and indicates a length of time after which the vehicle at the trajectory point will collide with the front obstacle. Each of the time gap values corresponds to a respective one of the trajectory points and indicates a time difference between passages of the vehicle at the trajectory point and the front obstacle through the obstacle location of the front obstacle.

Figure 3:
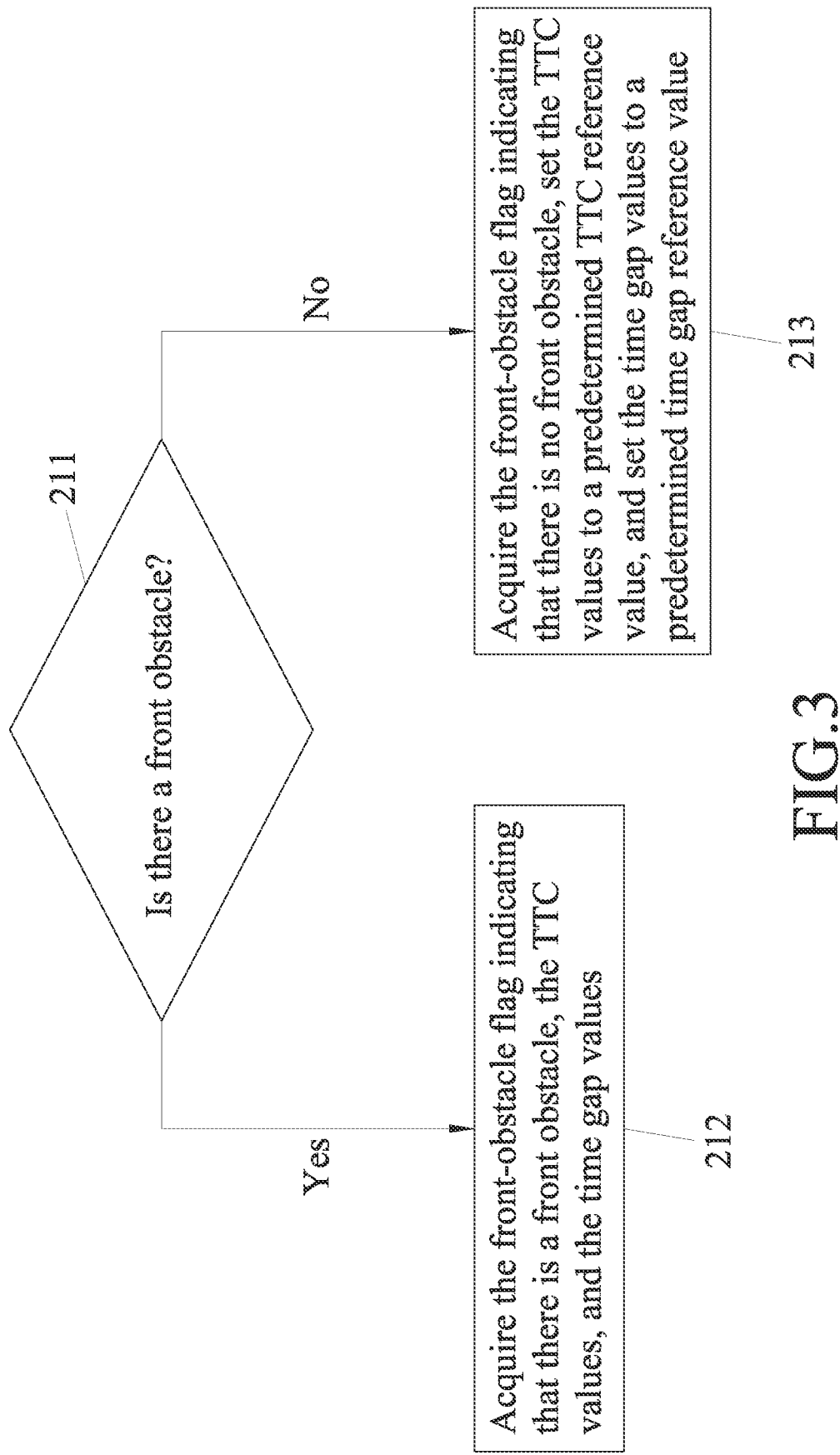
FIG. 3 is a flow chart illustrating step 21 of the embodiment in detail.

In detail, step 21 includes sub-steps 211-213 as shown in FIG. 3.

In sub-step 211, for each of the trajectory data pieces, the processing module 15 determines whether the obstacles include the front obstacle based on the obstacle data pieces. The flow goes to sub-step 212 when the determination is affirmative, and goes to sub-step 213 when otherwise.

Figure 4:
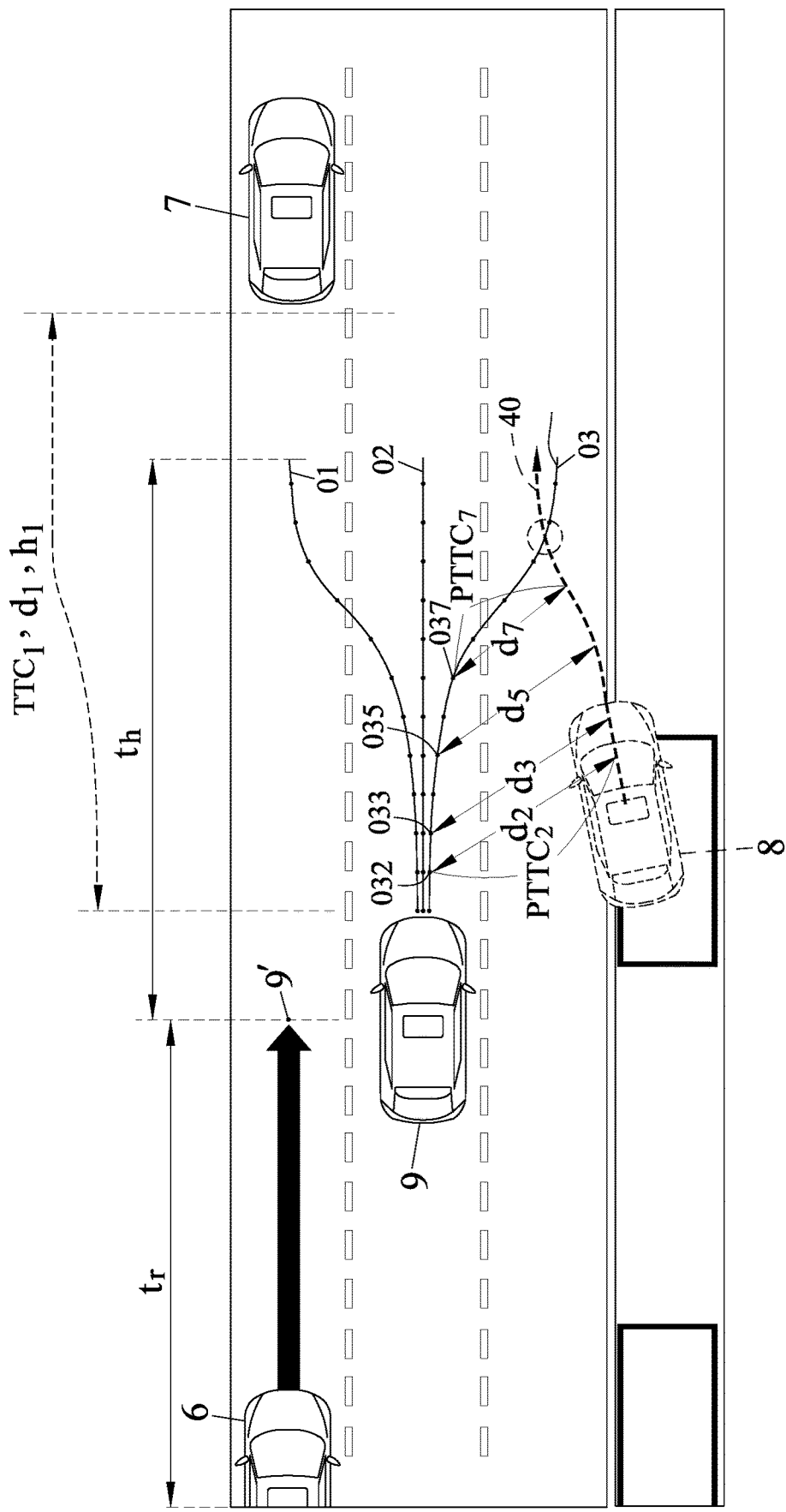
FIG. 4 is a schematic diagram illustrating an exemplary condition to describe operation of the embodiment.

In sub-step 212, the processing module 15 acquires the block flag which indicates that the obstacles include the front obstacle (e.g., by setting the block flag to binary "1") for the trajectory data piece, and, for each of the trajectory points of the trajectory data piece, the processing module 15 acquires the corresponding one of the TTC values and the corresponding one of the time gap values based on (i) one of the obstacle data pieces that is related to the front obstacle and (ii) the corresponding one of the proposed vehicle velocities. In this embodiment, the TTC value is obtained by: (a) calculating a first obstacle distance between a front of the vehicle at the corresponding trajectory point and the front obstacle, wherein the first obstacle distance is not a straight line distance but a distance along a driving path, and may be calculated by, for example, adding up a trajectory length between a head of the vehicle to the end of the candidate vehicle trajectory, and a path length from an end of the candidate vehicle trajectory to the front obstacle; (b) calculating a first relative velocity of the vehicle and the front obstacle based on the proposed vehicle velocity at the corresponding trajectory point and the obstacle velocity of the front obstacle; and (c) using the first relative velocity to divide the first obstacle distance. In a case that the first relative velocity is negative (e.g., the front obstacle moves faster than the vehicle in a forward direction, which is the direction the vehicle travels in), the processing module 15 sets the TTC value to a predetermined TTC reference value, which is a relatively large number (e.g., 100 seconds) when compared to normal TTC values, so as to facilitate data processing. The time gap value is obtained by using the proposed vehicle velocity at the corresponding trajectory point to divide the first obstacle distance. In an example as shown in FIG. 4, there is a front obstacle 7 in a path of the vehicle 9 if the vehicle 9 is to follow a first candidate vehicle trajectory 01, so the block flag for the first candidate vehicle trajectory 01 is set to 1, indicating that the vehicle 9 may encounter the front obstacle 7 if the vehicle 9 follows the first candidate vehicle trajectory 01. In FIG. 4, $d_1$, $TTC_1$, and $h_1$ respectively represent a first obstacle distance, a TTC value and a time gap value for the vehicle 9 at a location of the vehicle 9 as shown in FIG. 4 (a trajectory point). Both of $TTC_1$ and $h_1$ are calculated based on the first obstacle distance $d_1$ and have a unit of time (e.g., seconds).

In sub-step 213, the processing module 15 acquires the block flag which indicates that the obstacles do not include the front obstacle (e.g., by setting the block flag to binary "0") for the trajectory data piece, and sets, for each of the trajectory points of the trajectory data piece, the corresponding one of the TTC values and the corresponding one of the time gap values to the predetermined TTC reference value and a predetermined time gap reference value, respectively. The predetermined time gap reference value may be a relatively large number (e.g., 100 seconds) when compared to normal time gap values, so as to facilitate data processing. In FIG. 4, there is no front obstacle in a path of the vehicle 9 if the vehicle 9 is to follow either of a second candidate vehicle trajectory 02 and a third candidate vehicle trajectory 03, so block flags for the second and third candidate vehicle trajectories 02, 03 are both set to 0, indicating that the vehicle 9 would not encounter front obstacles if the vehicle follows the second or third candidate vehicle trajectory 02, 03.

Referring to FIGS. 1 and 2 again, in step 22, for each of the trajectory data pieces, the processing module 15 acquires an intersection flag and multiple PTTC (prediction time to collision) values based on the obstacle data pieces and the proposed vehicle velocities at the trajectory points of the trajectory data piece. The intersection flag indicates whether the obstacles include a potentially-colliding obstacle with a predicted obstacle path that intersects the candidate vehicle trajectory of the trajectory data piece. Each of the PTTC values corresponds to a respective one of the trajectory points and indicates a possible length of time after which the potentially-colliding obstacle will collide with the vehicle.

Figure 5:
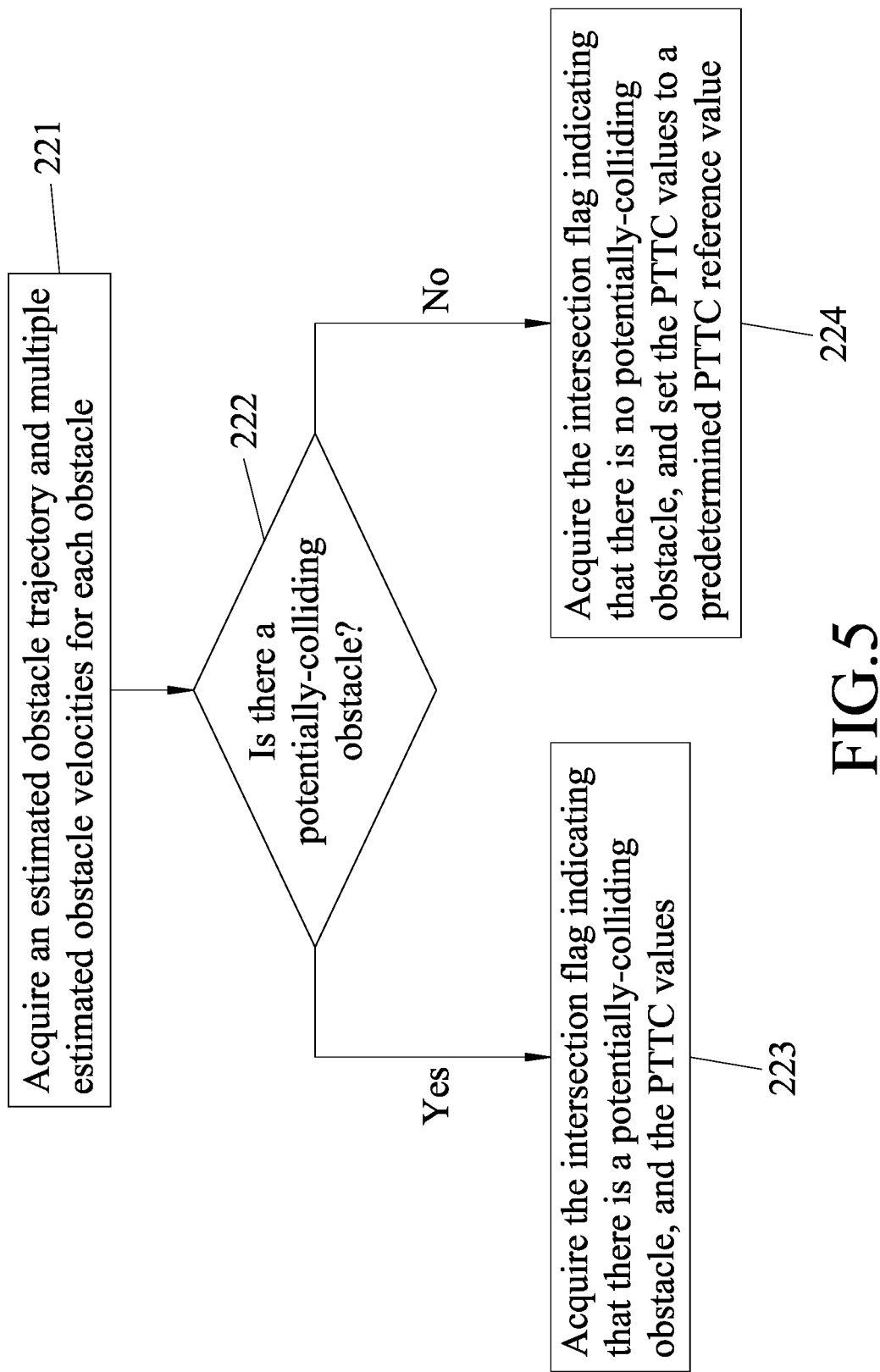
FIG. 5 is a flow chart illustrating step 22 of the embodiment in detail.

In detail, step 22 includes sub-steps 221-224 as shown in FIG. 5.

In sub-step 221, for each of the obstacles, the processing module 15 obtains, based on the corresponding one of the obstacle data pieces, an estimated obstacle trajectory and multiple estimated obstacle velocities that correspond to the vehicle travelling time period. To be more specific, the estimated obstacle trajectory is composed of multiple obstacle trajectory points in relation to different time points of the vehicle travelling time period, and the estimated obstacle velocities correspond to the obstacle trajectory points, respectively. The method for obtaining the estimated obstacle trajectory and the estimated obstacle velocities may be referenced to Taiwanese Patent No. 1531499 (its U.S. counterpart being U.S. Patent Application Publication No. 2014/0176714), so details thereof are omitted herein for the sake of brevity.

In sub-step 222, for each of the trajectory data pieces, the processing module 15 determines whether the obstacles include the potentially-colliding obstacle based on the estimated obstacle trajectory and the estimated obstacle velocities obtained in sub-step 221. The flow goes to sub-step 223 when the determination is affirmative, and goes to sub-step 224 when otherwise.

In sub-step 223, the processing module 15 acquires the intersection flag which indicates that the obstacles include the potentially-colliding obstacle (e.g., by setting the intersection flag to binary "1") for the trajectory data piece, and, for each of the trajectory points of the trajectory data piece, acquires the corresponding one of the PTTC values based on the estimated obstacle trajectory and the estimated obstacle velocities that correspond to the potentially-colliding obstacle and the corresponding one of the proposed vehicle velocities. For each of the trajectory points of the trajectory data piece, the PTTC value is calculated by: (a) calculating a second obstacle distance between the trajectory point and a corresponding obstacle trajectory point (corresponding to the trajectory point in time) on the obstacle estimated trajectory, wherein the second obstacle distance is a straight line distance between the trajectory point and the corresponding obstacle trajectory point on the obstacle estimated trajectory; (b) calculating a second relative velocity of the vehicle and the potentially-colliding obstacle based on the proposed vehicle velocity at the corresponding trajectory point and the estimated obstacle velocity of the potentially-colliding obstacle at the corresponding obstacle trajectory point; and (c) using the second relative velocity to divide the second obstacle distance. In a case that the second relative velocity is negative (e.g., the potentially-colliding obstacle moves much faster than the vehicle), the processing module 15 sets the PTTC value to a predetermined PTTC reference value, which is a relatively large number (e.g., 100 seconds) when compared to normal PTTC values, so as to facilitate data processing. In FIG. 4, there is a potentially-colliding obstacle 8 in a path of the vehicle 9 if the vehicle 9 is to follow the third candidate vehicle trajectory 03, so the intersection flag for the third candidate vehicle trajectory 03 is set to 1, indicating that the vehicle 9 may encounter the potentially-colliding obstacle 8 if the vehicle 9 follows the third candidate vehicle trajectory 03. In FIG. 4, $d_2$, $d_3$, $d_5$, and $d_7$ respectively represent the second obstacle distances between the trajectory points (032, 033, 035, 037) and an estimated obstacle trajectory 40, and $PTTC_2$ and $PTTC_7$ respectively represent the PTTC values that respectively correspond to the trajectory points (032, 037) of the third candidate vehicle trajectory 03. Both of $PTTC_2$ and $PTTC_7$ have a unit of time (e.g., seconds).

In sub-step 224, the processing module 15 acquires the intersection flag which indicates that the obstacles do not include the potentially-colliding obstacle (e.g., by setting the intersection flag to binary "0"), and sets the PTTC values that correspond to the trajectory data piece to the predetermined PTTC reference value. In FIG. 4, there is no potentially-colliding obstacle in a path of the vehicle 9 if the vehicle 9 is to follow either of the first and second candidate vehicle trajectories 01, 02, so the intersection flags for the first and second candidate vehicle trajectories 01, 02 are set to 0, indicating that the vehicle 9 would not encounter any potentially-colliding obstacle if the vehicle 9 follows the first or second candidate vehicle trajectory 01, 02.

Referring to FIGS. 1 and 2 again, in step 23, for each of the trajectory data pieces, the processing module 15 acquires a buffer distance for each of the trajectory points of the trajectory data piece based on the lateral distances detected by the lane space detection module 13. In this embodiment, for each of the trajectory points, the smallest one of the lateral distances that correspond to the trajectory point serves as the buffer distance.

In step 24, for each of the trajectory data pieces, the processing module 15 acquires, based on the lanes of the road as detected by the trajectory generation module 11, a lane-change flag that indicates whether the candidate vehicle trajectory of the trajectory data piece will cause a lane change for the vehicle. In FIG. 4, the first and third candidate vehicle trajectories 01, 03 will cause a lane change for the vehicle 9, so the lane-change flag for each of these candidate vehicle trajectories may be set to binary "1" to indicate that the candidate vehicle trajectory will cause a lane change for the vehicle 9. On the other hand, the second candidate vehicle trajectory 02 will not cause a lane change for the vehicle 9, so the lane-change flag of this candidate vehicle trajectory may be set to binary "0" to indicate that the candidate vehicle trajectory will not cause a lane change for the vehicle 9.

In step 25, for each of the trajectory data pieces, the processing module 15 acquires a safety flag based on the obstacle data pieces and the vehicle travelling time period. The safety flag indicates whether the lane change is safe. It is noted that, for ease of processing, the safety flag is acquired as a predetermined flag value even if the candidate vehicle trajectory of the trajectory data piece will not cause a lane change for the vehicle.

Figure 6:
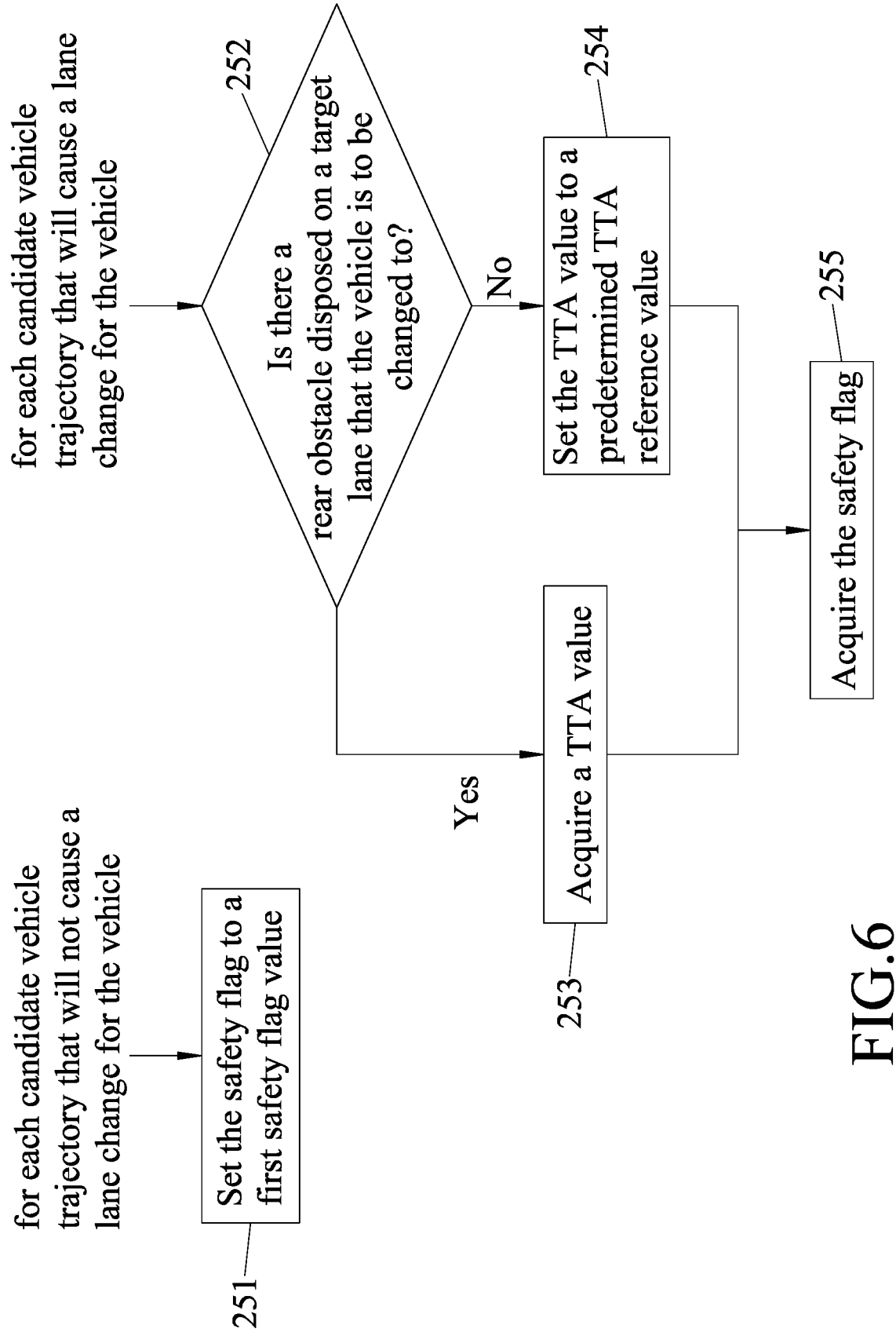
FIG. 6 is a flow chart illustrating step 25 of the embodiment in detail.

In detail, step 25 includes sub-steps 251-255 as shown in FIG. 6.

In sub-step 251, for each of those of the candidate vehicle trajectories of the trajectory data pieces that does not cause a lane change for the vehicle (i.e., the candidate vehicle trajectory of which the corresponding lane-change flag is set to 0), the processing module 15 sets the safety flag to a first safety flag value (e.g., binary "1").

In sub-step 252, for each of those of the candidate vehicle trajectories of the trajectory data pieces that causes a lane change for the vehicle, the processing module 15 determines, based on the obstacle data pieces, whether the obstacles include a rear obstacle disposed on a target lane that the vehicle is to be changed to if the vehicle is to follow the candidate vehicle trajectory. The flow goes to sub-step 253 when the determination is affirmative, and goes to sub-step 254 when otherwise. In FIG. 4, there is a rear obstacle 6 for the first candidate vehicle trajectory 01, and there is no rear obstacle for either of the second and third candidate vehicle trajectories 02, 03.

In sub-step 253, the processing module 15 acquires, based on one of the obstacle data pieces that corresponds to the rear obstacle, a TTA (time to arrival) value that indicates a length of time after which the rear obstacle will arrive at a location on the target lane that mirrors a current location of the vehicle.

In sub-step 254, the processing module 15 sets the TTA value to a predetermined TTA reference value, which is a relatively large number (e.g., 1000 seconds) when compared to normal TTA values, so as to facilitate data processing.

In sub-step 255, the processing module 15 acquires the safety flag based on the TTA value and the vehicle travelling time period. FIG. 4 exemplarily illustrates a location 9' on the target lane that mirrors the current location of the vehicle 9 for obtaining the TTA value for the first candidate vehicle trajectory 01. In FIG. 4, $t_r$ represents the TTA value for the first candidate vehicle trajectory 01, $t_h$ represents the vehicle travelling time period, and both of $t_r$ and $t_h$ have a unit of time (e.g., seconds).

Figure 7:
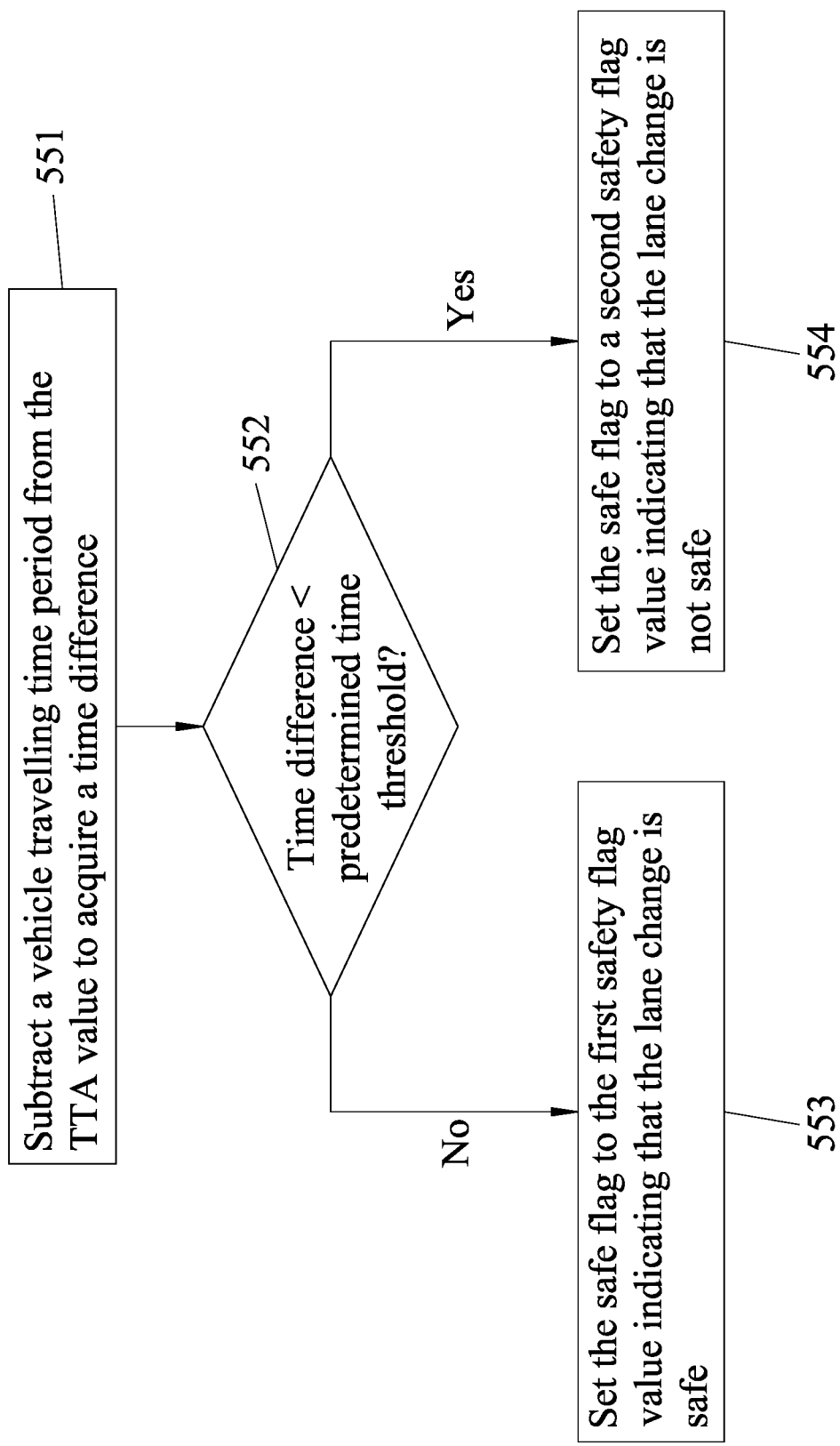
FIG. 7 is a flow chart illustrating sub-step 255 of the embodiment in detail.

Sub-step 255 further includes operations 551-554 for each of those of the candidate vehicle trajectories of the trajectory data pieces that causes a lane change for the vehicle, as shown in FIG. 7.

In operation 551, the processing module 15 subtracts the vehicle travelling time period from the corresponding TTA value to obtain a time difference.

In operation 552, the processing module 15 determines whether the time difference obtained in operation 551 is smaller than a predetermined time threshold (e.g., 1.8 seconds in this embodiment). The flow goes to operation 553 when the determination is negative, and goes to operation 554 when otherwise.

In operation 553, the processing module 15 sets the safety flag to the first safety flag value (e.g., binary "1"), indicating that the lane change is safe.

In operation 554, the processing module 15 sets the safety flag to a second safety flag value (e.g., binary "0") which indicates that the lane change is not safe.

Referring to FIGS. 1 and 2 again, in step 26, the processing module 15 determines, based on the speed limit, the block flag, the intersection flag, the lane-change flag, the safety flag, the proposed vehicle velocities at the trajectory points, the TTC values, the time gap values, the PTTC values and the buffer distance that are acquired for each of the trajectory data pieces, a target trajectory data piece from among the trajectory data pieces for the vehicle to drive along the candidate vehicle trajectory of the target trajectory data piece.

In detail, step 26 includes sub-steps 261-262 as shown in FIG. 8.

In sub-step 261, for each of the trajectory data pieces, the processing module 15 calculates a cost value according to:

$$\text{cost value} = \prod_{i=1}^{n} \frac{\left[e^{f(v_{limit}-v_i)}\right]^{1-F_{ob}} \cdot \left[e^{f(|h_i-t_{gap}^F|)}\right]^{F_{ob}}}{\left[e^{f(FSP_i)}\right]^{1-F_{ob}} \cdot f(TTC_i)^{F_{ob}} \cdot (1-I[F_{chgsafe} \neq 1])^{F_{LC}} \cdot f(PTTC_i)^{F_{int}}} \quad (1)$$

where:

n represents a number of the trajectory points of the trajectory data piece;

$t_{gap}^F$ represents a predetermined threshold for the time gap values;

f(x) is a normalization function that is represented as $$f(x) = \frac{x}{x_{max}};$$

$I[F_{chgsafe} \neq 1]=0$ when $F_{chgsafe}=1$, and $I[F_{chgsafe} \neq 1]=1$ when $F_{chgsafe}=0$;

$v_{limit}$ represents the speed limit of the road;

$F_{ob}$ represents the block flag;

$F_{int}$ represents the intersection flag;

$F_{LC}$ represents the lane-change flag; and $F_{chgsafe}$ represents the safety flag;

where, for each of the trajectory points:

$v_i$ represents the corresponding one of the proposed vehicle velocities;

$TTC_i$ represents the corresponding one of the TTC values;

$h_i$ represents the corresponding one of the time gap values;

$PTTC_i$ represents the corresponding one of the PTTC values (if there are multiple potentially-colliding obstacles that respectively correspond to multiple PTTC values for the trajectory points, the smallest one will be used herein); and $FSP_i$ represents the buffer distance.

It is noted that, for $$f(x) = \frac{x}{x_{max}},$$

$x_{max}$ is a greatest possible value of x. Taking $f(v_{limit}-v_i)$ as an example, $x=v_{limit}-v_i$, and $x_{max}$ is the maximum value among all of the values obtained by subtracting, for each of the trajectory points, the corresponding proposed vehicle velocity from the speed limit.

In sub-step 262, the processing module 15 determines the target trajectory data piece from among the trajectory data pieces for the vehicle based on the cost values of the trajectory data pieces. In this embodiment, the trajectory data piece that corresponds to the smallest one of the cost values is determined to be the target trajectory data piece.

According to equation (1), when there is no front obstacle (i.e., $F_{ob}=0$) in the path of the vehicle if the vehicle is to follow the candidate vehicle trajectory, the closer the vehicle velocity is to the speed limit of the road, the smaller the cost value is (see $e^{f(v_{limit}-v_i)}$). Thus, the proposed vehicle velocities that correspond to the target trajectory data will be as close to the speed limit of the road as possible when the corresponding candidate vehicle trajectory has no front obstacle.

According to equation (1), when there is a front obstacle (i.e., $F_{ob}=1$) in the path of the vehicle if the vehicle is to follow the candidate vehicle trajectory, the closer the corresponding time gap values are to the predetermined threshold for the time gap values, the smaller the cost value is (see $e^{f(|h_i-t_{gap}^F|)}$). Thus, the time gap values that correspond to the target trajectory data will be as close to the predetermined threshold $t_{gap}^F$ as possible when the corresponding candidate vehicle trajectory has a front obstacle.

According to equation (1), when the candidate vehicle trajectory will cause a lane change, the corresponding safety flag that is set to 0 will make the denominator in equation (1) be zero, and the cost value will be infinity or meaningless. Thus, if the safety flag is not 1, the corresponding trajectory data piece may not be determined as the target trajectory data piece.

Figure 9:
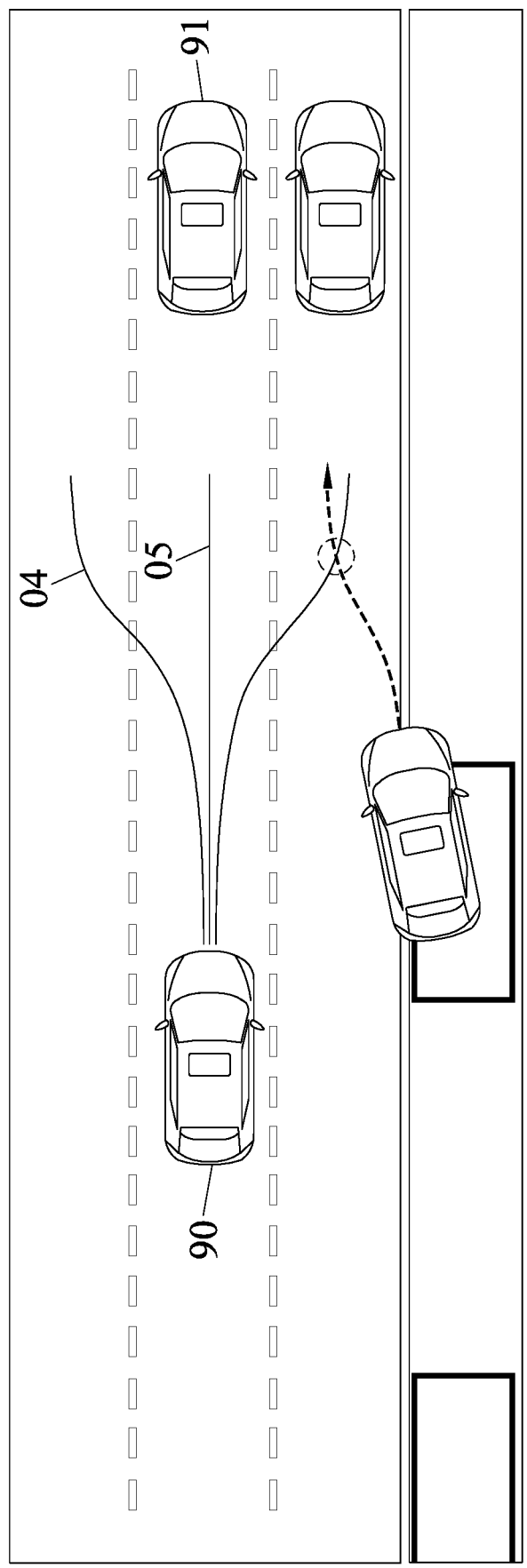
FIG. 9 is a schematic diagram illustrating another exemplary condition to describe operation of the embodiment.

According to equation (1), the parameter $f(TTC_i)^{F_{ob}}$ plays an important role in determining the target trajectory data piece. FIG. 9 illustrates an exemplary condition where the current lane on which a vehicle 90 is travelling has a front obstacle 91, and the trajectory data pieces generated by the trajectory generation module 11 include a candidate vehicle trajectory 04 and a candidate vehicle trajectory 05, wherein there is no front obstacle for the candidate vehicle trajectory 04 but the candidate vehicle trajectory 04 would cause a lane change, and there is the front obstacle 91 for the candidate vehicle trajectory 05 but the candidate vehicle trajectory 05 would not cause a lane change. The trajectory data piece that has the candidate vehicle trajectory 04 is more likely to be determined as the target trajectory data piece because $f(TTC_i)^{F_{ob}}$ that corresponds to the candidate vehicle trajectory 04 is greater than $f(TTC_i)^{F_{ob}}$ that corresponds to the candidate vehicle trajectory 05. It is noted that this example is only used to explain the significance of the parameter $f(TTC_i)^{F_{ob}}$, and the final determination on the target trajectory data piece should also take other parameters into consideration.

According to equation (1), a greater $FSP_i$ leads to better driving safety and a smaller cost value. Accordingly, when the vehicle has sufficient lateral distances from the obstacles beside the vehicle, some candidate vehicle trajectories may guide the vehicle to make a host lane change (dodge the front obstacle that is in the current lane while keeping the vehicle generally within the current lane), and then guide the vehicle back to the center of the current lane after the dodge in order to obtain a greater buffer distance. As a result, the trajectory data piece with a greater $FSP_i$ may have a greater chance at being determined as the target trajectory data piece.

According to equation (1), when none of lane change, dodging the front vehicle within the current lane, and following the front vehicle (continuing to drive behind the front vehicle) is viable and the vehicle has a risk of colliding with the front vehicle that is in the current lane (i.e., the TTC value is so small that following the front vehicle would not work), the target trajectory data piece will force the vehicle to stop, in order to make $f(TTC_i)$ larger.

After determining the target trajectory data piece in step 26, the processing module 15 controls the vehicle to drive along the candidate vehicle trajectory of the target trajectory data piece with the proposed vehicle velocities at the trajectory points of the target trajectory data piece.

In summary, the embodiment of the trajectory determination method for a vehicle according to this disclosure can determine an optimal trajectory data piece based on block flag, the intersection flag, the lane-change flag, the safety flag acquired for each of the trajectory data pieces generated by the trajectory generation module 11, and the proposed vehicle velocities, the TTC values, the time gap values, the PTTC values and the buffer distances acquired for the trajectory points of each of the trajectory data pieces, such that the vehicle can travel in an optimal way (e.g., travelling with the speed limit, following the front vehicle, changing lanes, making a host lane change, stopping) by taking intended trajectory of the obstacle into consideration, and the safety of the planned trajectory can thus be enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A trajectory determination method for a vehicle, implemented by a processing module that is electrically connected to a trajectory generation module, an obstacle detection module, a lane space detection module, and a road information module, the trajectory generation module generating a plurality of trajectory data pieces, each of the trajectory data pieces including multiple trajectory points that cooperatively compose a candidate vehicle trajectory for the vehicle to follow during a vehicle travelling time period, and multiple proposed vehicle velocities of the vehicle respectively at the trajectory points, the obstacle detection module detecting obstacles that are spaced apart and within a predetermined distance from the vehicle to generate obstacle data pieces that are respectively related to the obstacles, each of the obstacle data pieces including an obstacle location, an obstacle velocity and an obstacle acceleration of the corresponding one of the obstacles, the lane space detection module detecting a pair of lateral distances respectively for two sides of the vehicle, wherein each of the lateral distances is a distance between the vehicle and one of the obstacles that is at the respective side of the vehicle and that is spaced apart from the vehicle laterally, the road information module providing a speed limit of a road on which the vehicle is travelling, the trajectory determination method comprising:

A) for each of the trajectory data pieces, acquiring a block flag, multiple TTC values and multiple time gap values based on the obstacle data pieces and the proposed vehicle velocities at the trajectory points of the trajectory data piece, wherein the block flag indicates whether the obstacles include a front obstacle in the candidate vehicle trajectory of the trajectory data piece, wherein each of the TTC values corresponds to a respective one of the trajectory points and indicates a length of time after which the vehicle at the trajectory point will collide with the front obstacle, and wherein each of the time gap values corresponds to a respective one of the trajectory points and indicates a time difference between passages of the vehicle at the trajectory point and the front obstacle through the obstacle location of the front obstacle;

B) for each of the trajectory data pieces, acquiring an intersection flag and multiple PTTC values based on the obstacle data pieces and the proposed vehicle velocities at the trajectory points of the trajectory data piece, wherein the intersection flag indicates whether the obstacles include a potentially-colliding obstacle with a predicted obstacle path that intersects the candidate vehicle trajectory of the trajectory data piece, and wherein each of the PTTC values corresponds to a respective one of the trajectory points and indicates a possible length of time after which the potentially-colliding obstacle will collide with the vehicle;

C) for each of the trajectory data pieces, acquiring a buffer distance for each of the trajectory points of the trajectory data piece based on the lateral distances detected by the lane space detection module;

D) for each of the trajectory data pieces, acquiring a lane-change flag that indicates whether the candidate vehicle trajectory of the trajectory data piece will cause a lane change for the vehicle;

E) for each of the trajectory data pieces, acquiring a safety flag based on the obstacle data pieces and the vehicle travelling time period, wherein the safety flag indicates whether the lane change is safe; and F) based on the speed limit, the block flag, the intersection flag, the lane-change flag, the safety flag, the TTC values, the time gap values, the PTTC values and the buffer distance that are acquired for each of the trajectory data pieces, determining a target trajectory data piece from among the trajectory data pieces for the vehicle to drive along the candidate vehicle trajectory of the target trajectory data piece.

2. The trajectory determination method of claim 1, wherein step A) includes, for each of the trajectory data pieces:

A-1) determining whether the obstacles include a front obstacle based on the obstacle data pieces;

A-2) when the determination made in sub-step A-1) is affirmative, acquiring the block flag which indicates that the obstacles include a front obstacle, and, for each of the trajectory points of the trajectory data piece, acquiring the corresponding one of the TTC values and the corresponding one of the time gap values based on one of the obstacle data pieces that is related to the front obstacle and the corresponding one of the proposed vehicle velocities; and A-3) when the determination made in sub-step A-1) is negative, acquiring the block flag which indicates absence of a front obstacle in the obstacles, and setting, for each of the trajectory points of the trajectory data piece, the corresponding one of the TTC values and the corresponding one of the time gap values to a predetermined TTC reference value and a predetermined time gap reference value, respectively.

3. The trajectory determination method of claim 1, wherein step B) includes:

B-1) for each of the obstacles, obtaining, based on the corresponding one of the obstacle data pieces, an estimated obstacle trajectory and multiple estimated obstacle velocities that correspond to the vehicle travelling time period;

B-2) for each of the trajectory data pieces, determining whether the obstacles include a potentially-colliding obstacle based on the estimated obstacle trajectory and the estimated obstacle velocities obtained in sub-step B-1);

B-3) for each of the trajectory data pieces, when the determination made in sub-step B-2) is affirmative, acquiring the intersection flag which indicates that the obstacles include a potentially-colliding obstacle, and for each of the trajectory points of the trajectory data piece, acquiring the corresponding one of the PTTC values based on the estimated obstacle trajectory and the estimated obstacle velocities that correspond to the potentially-colliding obstacle and the corresponding one of the proposed vehicle velocities; and B-4) for each of the trajectory data pieces, when the determination made in sub-step B-2) is negative, acquiring the intersection flag which indicates that the obstacles do not include a potentially-colliding obstacle, and setting the PTTC values that correspond to the trajectory data piece to a predetermined PTTC reference value.

4. The trajectory determination method of claim 1, wherein step E) includes:
E-1) for each of those of the candidate vehicle trajectories of the trajectory data pieces that will cause a lane change for the vehicle, determining, based on the obstacle data pieces, whether the obstacles include a rear obstacle disposed on a target lane that the vehicle is to be changed to if the vehicle is to follow the candidate vehicle trajectory;
E-2) for each of those of the candidate vehicle trajectories of the trajectory data pieces that will cause a lane change for the vehicle, when the determination made in sub-step E-2) is affirmative, acquiring, based on one of the obstacle data pieces that corresponds to the rear obstacle, a TTA value that indicates a length of time after which the rear obstacle will arrive at a location on the target lane that mirrors a current location of the vehicle;
E-3) for each of those of the candidate vehicle trajectories of the trajectory data pieces that will cause a lane change for the vehicle, when the determination made in sub-step E-2) is negative, setting the TTA value to a predetermined TTA reference value; and
E-4) for each of those of the candidate vehicle trajectories of the trajectory data pieces that will cause a lane change for the vehicle, acquiring the safety flag based on the TTA value and the vehicle travelling time period.

5. The trajectory determination method of claim 4, wherein sub-step E-4) includes, for each of those of the candidate vehicle trajectories of the trajectory data pieces that will cause a lane change for the vehicle;
subtracting the vehicle travelling time period from the TTA value to obtain a time difference; setting the safety flag to a first safety flag value when the time difference is not smaller than a predetermined time threshold to indicate that the lane change is safe; and
setting the safety flag to a second safety flag value which indicates that the lane change is not safe when the time difference is smaller than the predetermined time threshold.

6. The trajectory determination method of claim 1, wherein step F) includes:
F-1) for each of the trajectory data pieces, calculating a cost value according to:

$$\text{cost value} = \prod_{i=1}^{n} \frac{\left[e^{f(v_{limit}-v_i)}\right]^{1-F_{ob}} \cdot \left[e^{f(|h_i-t^F_{gap}|)}\right]^{F_{ob}}}{\left[e^{f(FSP_i)}\right]^{1-F_{ob}} \cdot f(TTC_i)^{F_{ob}} \cdot (1-I[F_{chgsafe} \neq 1])^{F_{LC}} \cdot f(PTTC_i)^{F_{int}}}$$

where:
n represents a number of the trajectory points of the trajectory data piece;
$t_{gap}^F$ represents a predetermined threshold for the time gap values;
f(x) is a normalization function;
$I[F_{chgsafe} \neq 1] = 0$ when $F_{chgsafe} = 1$, and $I[F_{chgsafe} \neq 1] = 1$ when $F_{chgsafe} = 0$;
$v_{limit}$ represents the speed limit of the road;
$F_{ob}$ represents the block flag;
$F_{int}$ represents the intersection flag;
$F_{LC}$ represents the lane-change flag; and
$F_{chgsafe}$ represents the safety flag;
where, for each of the trajectory points:
$v_i$ represents the corresponding one of the proposed vehicle velocities;
$TTC_i$ represents the corresponding one of the TTC values;
$h_i$ represents the corresponding one of the time gap values;
$PTTC_i$ represents the corresponding one of the PTTC values; and
$FSP_i$ represents the buffer distance; and
F-2) determining the target trajectory data piece from among the trajectory data pieces for the vehicle based on the cost values of the trajectory data pieces.

7. The trajectory determination method of claim 6, wherein $$f(x) = \frac{x}{x_{max}},$$

and $x_{max}$ is a greatest possible value of X.

* * * * *